No. 889,691. PATENTED JUNE 2, 1908.
C. H. KESSLER.
GAME CHOKER.
APPLICATION FILED APR. 3, 1907.
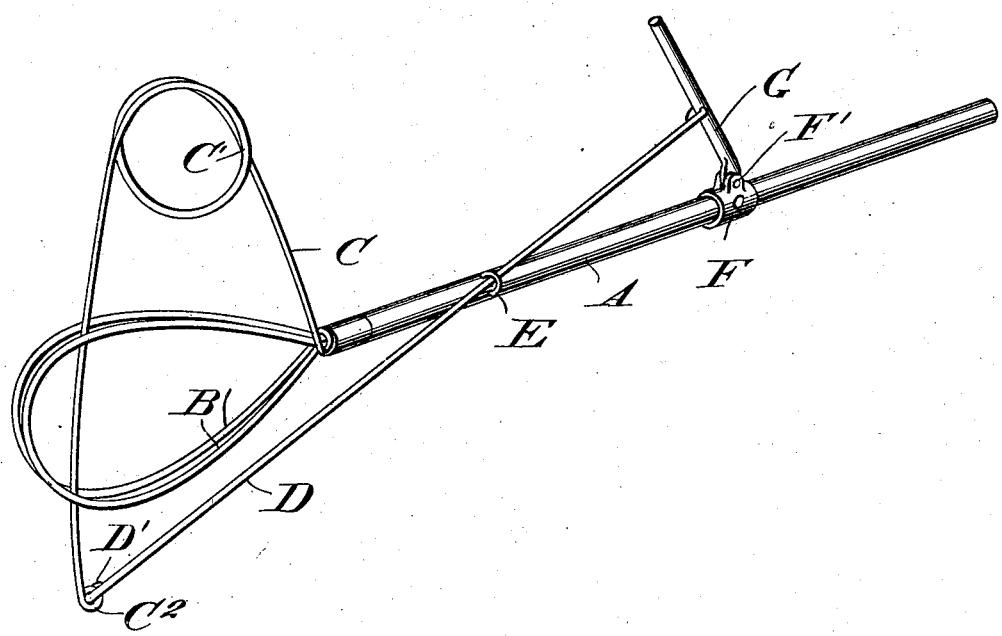
Witnesses
Phil E. Barnes
Rea Albright.
Inventor
C. H. Kessler.
By Oliman & Brock
Attorneys

UNITED STATES PATENT OFFICE.

CHARLES H. KESSLER, OF ODESSA, MISSOURI.

GAME-CHOKER.

No. 889,691.  Specification of Letters Patent.  Patented June 2, 1908.

Application filed April 3, 1907. Serial No. 366,127.

*To all whom it may concern:*

Be it known that I, CHARLES H. KESSLER, a citizen of the United States, residing at Odessa, in the county of Lafayette and State of Missouri, have invented a new and useful Improvement in a Game-Choker, of which the following is a specification.

This invention relates to game chokers for killing animals after they have been caught in traps, and more particularly to a choker for killing skunks, minks and other animals which send forth a bad odor when they are being killed; the object being to provide a device which can be readily placed over the neck of the animal from a safe distance and one which will kill the animal gradually without causing the animal to send forth any unpleasant odor.

Another object of my invention is to provide a device which can be readily used for catching and killing poultry.

In the accompanying drawing I show a perspective view of my improved choker in which A indicates a pole of any desirable length in the end of which is secured a pair of spaced loops B which are adapted to be placed over the head of the animal to be killed.

Secured around the loops B adjacent the handle A is the end of a spring wire C which extends upwardly and is coiled at C' and the free end extends down between the loops B and is provided with an eye C² at its end to which the eye D', of a rod D, is connected, which is slidably mounted in an eye E secured to one side of the handle A.

A sleeve F is secured over the handle adjacent its end provided with spaced apertured ears F' between which is pivotally mounted the apertured end of a lever G. An opening is formed in the lever, midway its length in which is secured the end of the rod D so that the spring can be drawn back by pulling on the lever.

From the foregoing description it will be readily seen that I have provided a device which is very simple and cheap in construction and one which is very effective in use.

The operation of the device is as follows:—

The pole is caught hold of and the lever pulled back so as to draw the spring back towards the handle in the loop. The loops are then placed over the head of the animal and allowed to rest around the neck, the lever is then released and the force of the spring against the neck of the animal will gradually choke the animal to death.

Having thus fully described my invention, what I claim as new and desire to secure by Letters Patent is:—

1. A device of the kind described, comprising a pole, a loop carried by an end of the pole, a spring having one end secured to the pole, said spring working parallel to one side of the loop, an eye carried by the pole and upon the side of the loop opposite that upon which the spring works, and a rod connected to the free end of the spring and working through said eye.

2. The combination with a pole provided with spaced loops at one end, of a spring secured to said loops working between said loops, a lever mounted on said pole and a rod connecting the free end of said spring to said lever.

3. The combination with a pole, of a pair of loops secured in one end of said pole, a wire spring secured to said loops provided with a free end working between said loop, a lever mounted on said pole adjacent its other end, and a rod slidably mounted on said pole connecting the lever and the free end of the spring.

4. The combination with a pole, of spaced loops secured in one end of the lever, a coiled wire spring having one end secured around said loop adjacent the pole, and its free end arranged between said loops, a rod slidably mounted on said pole connected to the free end of said spring, a sleeve secured on said pole adjacent its other end provided with apertured ears, and a lever mounted in said ears connected to said rod, for the purpose described.

CHARLES H. KESSLER.

Witnesses:
W. F. WAGONER,
WILSON J. LUDWICK.